United States Patent [19]

Huang

[11] Patent Number: 5,072,909

[45] Date of Patent: Dec. 17, 1991

[54] ADJUSTABLE CUP HOLDER IN THE CAR

[76] Inventor: Tzu-Ping Huang, 4th Floor, 12-1 Alley 15, Lane 214, Chunghsin Road, Sec. 4, Sanchung City, Taipei Hsien, Taiwan

[21] Appl. No.: 522,593

[22] Filed: May 10, 1990

[51] Int. Cl.⁵ .................................................. A47K 1/00
[52] U.S. Cl. ............................... 248/311.2; 248/316.4; 248/215
[58] Field of Search ................. 248/311.2, 316.4, 291, 248/289.1, 298, 318, 215, 221.3, 150; 297/194, 188; 224/273, 274

[56] References Cited

U.S. PATENT DOCUMENTS

| | | | |
|---|---|---|---|
| 3,215,388 | 11/1965 | Culver | 248/313 |
| 3,823,907 | 7/1974 | Ziaylek, Jr. | 248/313 |
| 4,511,072 | 4/1985 | Owens | 108/44 X |
| 4,828,211 | 5/1989 | McConnell et al. | 248/316.4 X |
| 4,844,400 | 7/1989 | Jasmagy, Jr. | 248/311.2 |
| 4,887,784 | 12/1989 | Kayali | 248/311.2 |

Primary Examiner—Karen J. Chotkowski

[57] ABSTRACT

An adjustable cup holder in the car consisting chiefly of a fixing plate, a cover plate, a left arm and a right arm, and a arm bar, of which all the components (members), including spring leaves, are made of heat-resistant plastic with strong tenacity through integral moulding, assembled through direct insertion and pivotal engagement with each other, and quite simple structure; its manufacture and assembly are simple, convenient and quick, the adjustment of opening dimensions of two arms is also quite convenient and rapid, but the friction between the two arms will not lead to malfunction or to the loss of adjustability of these two arms, and a reverse J-shaped metal strip may be provided to the fixing plate in favor of direct hanging the cup holder on the window of car.

4 Claims, 2 Drawing Sheets

ADJUSTABLE CUP HOLDER IN THE CAR

BACKGROUND OF THE INVENTION

There was the cup holder in the car in the past but its arms are fixed and not adjustable for the desirable dimensions. Therefore, it is rather inconvenient to dispose the cup or canned beverage therein: the cup or can with larger diameter cannot be disposed therein for use, and that with smaller diameter tends to be fallen down when the car is turning direction braking urgently.

Recently in view of the foregoing drawbacks of conventional cup holders someone improved and invented a foldable support for beverage container (U.S. Pat. No. 4,828,211). However, the structure of said support is quite complex and in need of two steel spring leaves fixed onto the fixing panel (tea cup holder) to position the two arms and cover panels, so its manufacture and assembly are quite inconvenient, and when to adjust it for use, the three sets of concave arcuate grooves on its two plastic arms tend to cause wearing when they contact the positioning convex knobs on the said steel spring leaves, so the two arms cannot be in place and adjustable but will be out of order, and the support is quite neither ideal nor practical.

In view of the above, the present inventor, through his repeated research and experiment, has developed an "adjustable cup holder in the car" with simple structural device which is convenient to manufacture, assemble, install and use, difficult to wear off the two arms cause malfunction, and desirable to keep the adjustability of said two arms.

BRIEF SUMMARY OF THE INVENTION

The primary object of the present invention is to offer an adjustable cup holder in the car wherein all the components (members), including the spring leaves, are made of heat-resistant plastic with strong tenacity through integral moulding and can be assembled through direct engagement and pivotal catch, of which the structure is simple, the manufacture and assembly can be quite easily finished, the adjustment of opening dimensions of two arms is quite convenient and rapid, and the two arms are hard to wear off to cause malfunction or to lose the function of said adjustment.

Another object of the present invention is to offer an adjustable cup holder wherein a reverse J-shaped metal strip may be mounted onto the fixing plate in favor of directly hanging the holder on the window of car for use.

Figure 1:
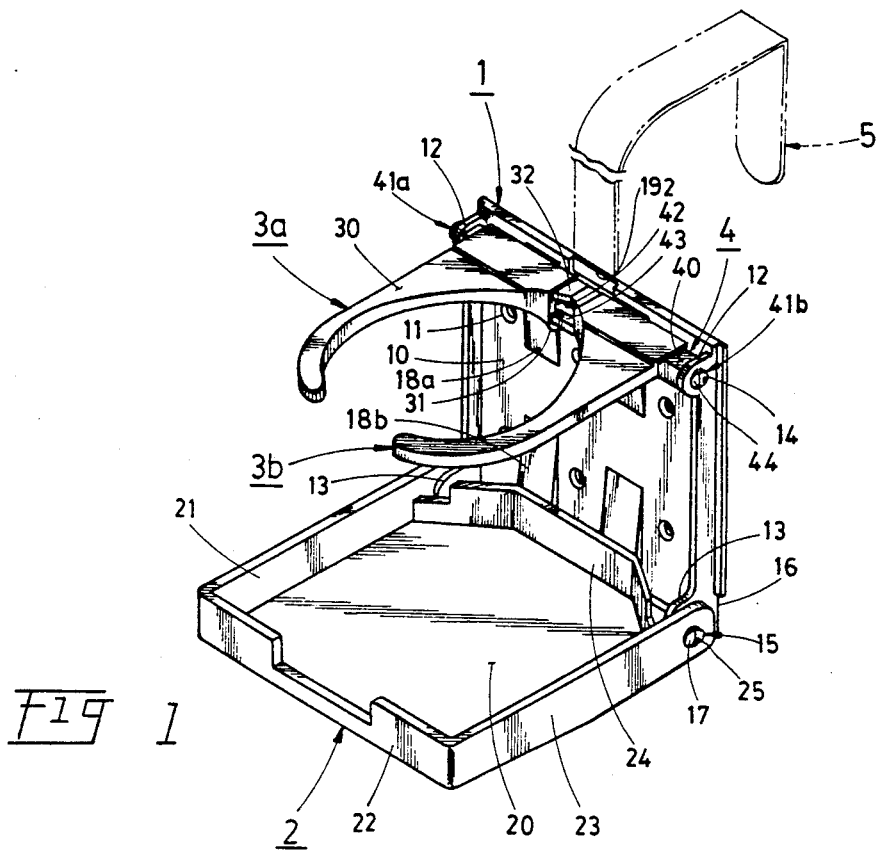
FIG. 1 is an elevational view of the present invention ready for use.

Cross-reference numbers:

1 ... fixing plate
2 ... cover plate
3a ... left arm
3b ... right arm
4 ... arm bar
5 ... reverse J-shaped metal strip
10 ... plate body
11 ... opening
12 ... upper ear
13 ... lower ear
14 ... hole
15 ... hinge pin
16 ... notch
17 ... inclined plane
18 ... spring leaf
19 ... slot
20 ... plate body
21 ... retainer
22 ... retainer
23 ... retainer
24 ... retainer
25 ... hole
30 ... bar body
31 ... sleeve
32 ... spring leaf
33 ... positioning stand
40 ... bar body
41a, 41b ... short hinge pin
42 ... rack face
43 ... separatory stand
44 ... inclined plane
191 ... reverse L-shaped retainer
192 ... flat U-shaped notch

DETAILED DESCRIPTION

As shown in FIG. 1, the adjustable cup holder in the car of the present invention consists chiefly of a fixing plate 1, a cover plate 2, a left arm 3a and a right arm 3b, and a arm bar 4.

Figure 4:
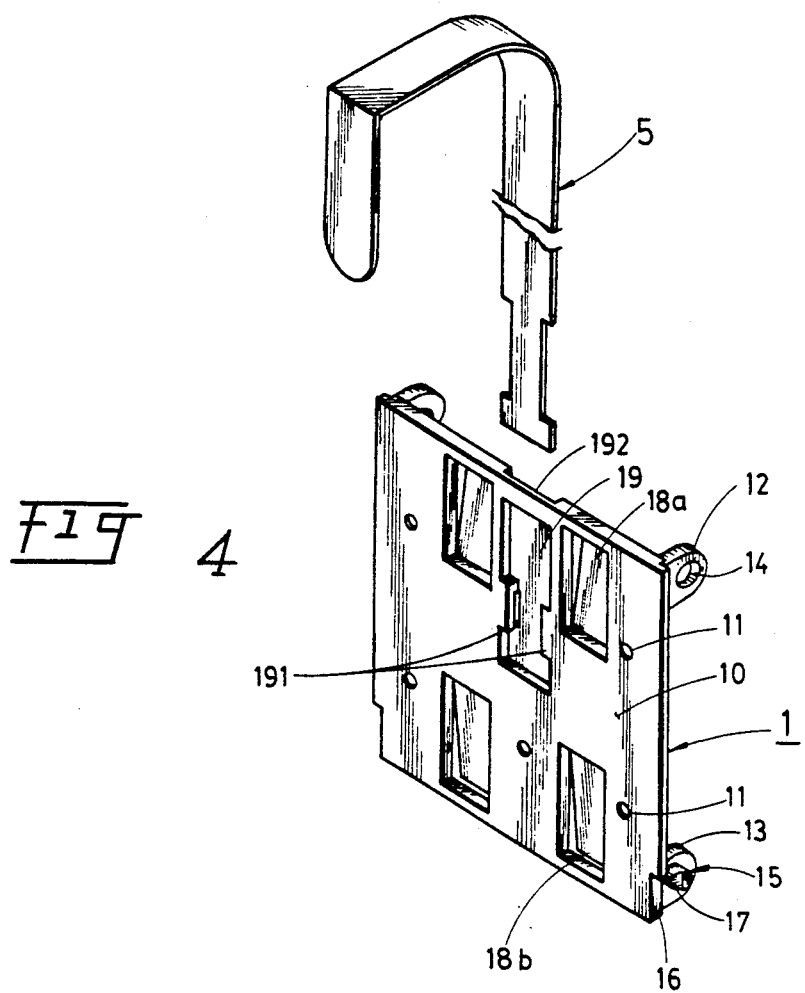
FIG. 4 is an elevational view of fixing plate and reverse J-shaped metal strip of the present invention.

The fixing plate 1, as shown in FIGS. 1 and 4, is generally a rectangular or square plate body 10 whereon a plurality of openings 11 are provided for inserting some screws to fix the present invention in the car. A pair of ears 12, 13 each are provided to the two sides on the upper and lower edges on the front side of plate body 10. A hole 14 each is provided to the center of the upper pair of ears 12 for pivotally catching the arm bar 4. A hinge pin 15 is provided to each of the two outer sides of lower pair of ears 13 for pivotal engagement with cover plate 2, and in order to facilitate the said pivotal engagement with cover plate 2. A notch 16 may be provided to each corner on the two lower sides of plate body 10.

Figure 5:
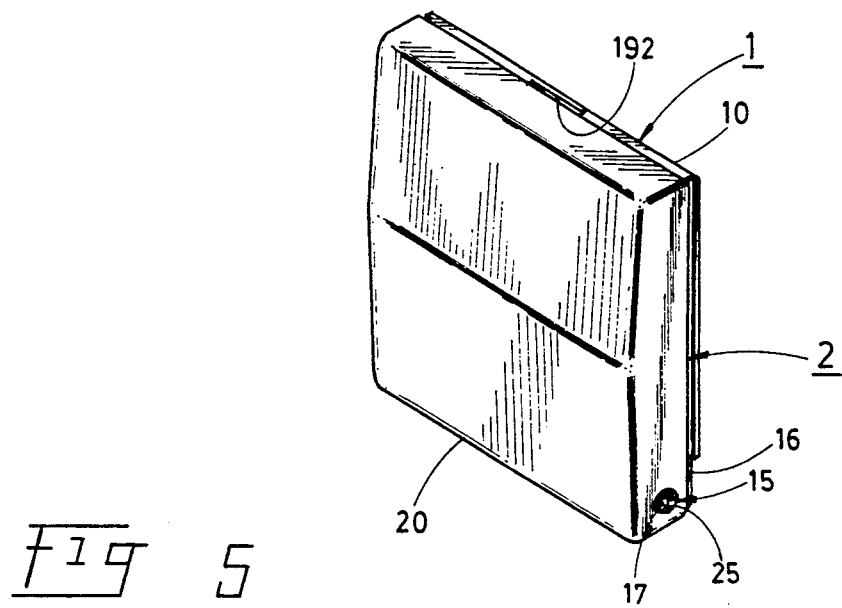
FIG. 5 is an elevational view of the present invention in a collapsible form.

The cover plate 2, as shown in FIG. 1, is provided with the retainers 21, 22, 23 and 24 on the edges on the left, right, front and rear sides of its plate body 20. A hole 25 is provided to each of ends of left and right retainers 22, 23 of plate body 20 for pivotal engagement with the lower pair of ears 13 on the plate body 10 of fixing plate 1 and for folding the cover plate 2 to cover the fixing plate 1 (in the collapsible form as shown in FIG. 5) or the cover plate 2 can be vertical to the fixing plate 1 to form a 90° angle therebetween, namely. The cover plate 2 is in a horizontal state to dispose a cup or beverage can therein (as shown in FIG. 1).

Figures 2, 3:
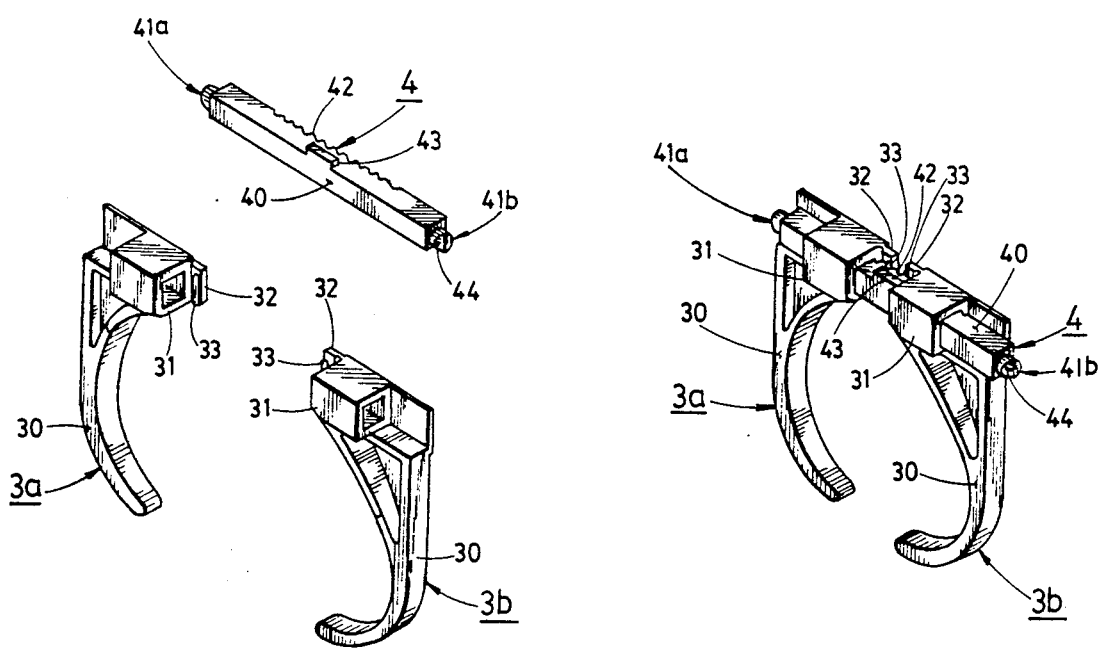
FIG. 2 is an elevational breakdown view of left and right arms and arm bar of the present invention.
FIG. 3 is an elevational assembly view of left and right arms and arm bar of the present invention.

The left and right arms 3a, 3b, as shown in FIG. 2, with a similar shape and structure corresponding to each other, are generally arcuate bar bodies 30. A sleeve 31 with a hole corresponding to the shape of bar body 40 of arm bar 4 is provided to each rear (inner) end of said bar bodies 30, and a spring leaf 32 with a positioning stand 33 at its lower side is provided to the inner edge of sleeve 30.

The arm bar 4, as shown in FIG. 2, is a solid square bar body 40 with short hinge pins 41a, 41b at its two ends, a rack face 42 of a plurality of arcuate racks in its middle, and a separatory stand 43 at the center on its front side.

All the components (members) of the present invention are made of heat-resistant plastic with strong tenacity through integral moulding, and the necessary spring leaf 18, as shown in FIG. 1 and 4, consists of a pair of oblique upper and lower spring leaves 18a, 18b on the upper and lower sides on the front side of plate body 10 respectively.

To assemble the present invention, firstly, as shown in FIG. 3, to engage the left and right arms 3a, 3b with the arm bar 4, then pivotally catch the arm bar 4 onto the upper ears 12 on the two sides on the upper edge on the front side of fixing plate body 10 through the short hinge pins 41a, 41b at the two ends of bar body 40 of arm bar 4, and finally engage the cover plate 2 with the fixing plate 1 through inserting the hinge pins 15 on the ears 13 on the two sides on the lower edge on the front side of the plate body 10 into the holes 25 at the rear ends of retainers 21,23 on the left and right sides of plate body 20. Then the assembly of the present invention is finished.

Since the structural device of the present invention is quite simple, its assembly is quite convenient and quick. When the left and right arms 3a, 3b are engaged with the arm bar 4 (as shown in FIG. 3), the opening dimensions of these two arms can be optionally adjusted, and these two arms can be fixed to the arm bar 4 through inserting the positioning stands 33 on the lower sides of spring leaves 32 on the inner edge of sleeves 31 into the grooves on the rack face 42 on the bar body 40.

Since the plate body 10 of fixing plate 1 and the two pairs of spring leaves 18a, 18b are integrally moulded, it is not necessary to provide spring leaves to the plate body 10 any more as the conventional one, and the left and right arms 3a, 3b and the fixing plate 2 can be elastically supported to keep them in a horizontal state so to form a 90° angle toward the fixing plate 1 as shown in FIG. 1 or to be foled up and down to cover the plate body 10 of fixing plate 1 in a collapsible state as shown in FIG. 5.

In order to easily and pivotally engage the arm bar 4 and cover plate 2 with the fixing plate 1, the end surfaces of hinge pins 15 on the lower pair of ears 13 of fixing plate 1 and the short hinge pins 41a, 41b at the two ends of the two arms 3a, 3b are provided with the inclined planes 17, 44 which occupy about one half area of the said end surfaces. Meantime, the arm bar 4 is designed to synchronously drive the left and right arms 3a, 3b, so the shape of solid bar body 40 may also be rectangular or a flat O or D.

The present invention can be fixed in the car. In addition, it can be hung on the window of car, so a slot 19 may be provided to the central upper side on the back of plate body 10 of fixing plate 1 as shown in FIG. 4. A pair of reverse L-shaped retainers 191 may be provided to the two sides of said slot 19, and a flat U-shaped notch 192 to communicate with the said slot 19 may be provided to a position on the central upper edge on the front side of plate body 10 of the fixing plate 1, so as to insert a reverse J-shaped metal strip 5 therein.

I claim:
1. An adjustable cup holder in the car, comprising:
    a fixing plate, which is generally a rectangular or square plate body whereon a plurality of openings are provided, a pair of ears each are provided to the two sides on the upper and lower edges on the front side of plate body, a hole is provided to the center of the upper pair of ears, a hinge pin is provided to each of the two outer sides of lower pair of ears, and a notch is provided to each corner on the two lower sides of plate body;
    a cover plate, which is provided with retainers on the edges on the left, right, front and rear sides of its plate body, and a hole is provided to each of ends of left and right retainers of plate body for pivotal engagement with the lower pair of ears on the plate body of fixing plate for folding the cover plate to cover the fixing plate or the cover plate can be vertical to the fixing plate to form a 90° angle therebetween so that the cover plate is in a horizontal state to be ready for use;
    a left arm and a right arm, which are generally arcuate bar bodies with a similar shape and structure corresponding to each other; and
    an arm bar, which is a bar body provided with short hinge pins at its two ends to engage with the left and right arms and then pivotally caught onto the ears on the two sides on the upper edge of the plate body of fixing plate through the said hinge pins so that it can be folded to contact the fixing plate or vertical to the fixing plate to form a 90° angle therebetween to be in a horizontal state and ready for use; which is characterized by the following:
    a pair of oblique upper and lower spring leaves are provided to the upper and lower sides on the front side of plate body of the fixing plate;
    a sleeve with a hole corresponding to the shape of bar body of arm bar is provided to the rear (inner) end thereof, and a spring leaf with a positioning stand at its lower side is provided to the inner edge of sleeve;
    and said arm bar is a solid square bar body with a rack face of a plurality of arcuate racks in its middle and separatory stand at the center on its front side.
2. An adjustable cup holder in the car as claimed in claim 1 wherein the shape of solid bar body of arm bar includes rectangular or a flat O or D.
3. An adjustable cup holder in the car as claimed in claim 1 wherein the end surfaces of hinge pins on the lower pair of ears of fixing plate and the short hinge pins at the two ends of the arm bar are provided with the inclined planes which occupy about one half area of surfaces of said ends.
4. An adjustable cup holder in the car as claimed in claim 1 wherein a slot is provided to the central upper side on the back of plate body of fixing plate, a pair of reverse L-shaped retainers is provided to the two sides of said slot, and a flat U-shaped notch to communicate with the said slot may be provided to a position on the central upper edge on the front side of plate body of the fixing plate so as to insert a reverse J-shaped metal strip therein in favor of directly hanging the cup holder on the window of car.

* * * * *